June 18, 1968     D. W. CARLSON     3,388,669
POWER TRANSMISSION

Filed June 1, 1966     2 Sheets-Sheet 1

INVENTOR.
Donald W. Carlson
BY
Herbert Furman
ATTORNEY

June 18, 1968  D. W. CARLSON  3,388,669
POWER TRANSMISSION

Filed June 1, 1966 2 Sheets-Sheet 2

INVENTOR.
Donald W. Carlson
BY
Herbert Freeman
ATTORNEY

United States Patent Office 3,388,669
Patented June 18, 1968

3,388,669
POWER TRANSMISSION
Donald W. Carlson, Belleville, Mich., assignor to General Motors Corporation, Detroit, Mich., a corporation of Delaware
Filed June 1, 1966, Ser. No. 554,528
4 Claims. (Cl. 103—38)

ABSTRACT OF THE DISCLOSURE

A pump piston is reciprocated by a bellcrank that is driven through a power transmission by a rotary shaft driven by a vehicle fan belt. The transmission includes a drive member connected through a yoke to the bellcrank. The drive member is mounted for radial movement relative to the drive shaft between eccentric and concentric positions by a control mechanism including a support member journalled on the drive shaft, a control member pivoted thereto at a spaced point and having a centrifugally operated weight attached thereto, and an eccentric pin mounted on the control member and engaging the drive member. Increasing shaft speed will cause the weight to rotate the control member to vary the eccentricity of the drive member and thus vary the stroke of the pump piston. A balance member similar to the drive member is provided for movement in a direction diametrically opposite that of the drive member for balancing purposes.

---

This invention relates generally to power transmissions and more specifically to a power transmission for a reciprocating pump.

The power transmission of this invention comprises a rotary input member, an eccentric drive member, a driven member, a reciprocating output member and means interconnecting the driven member and the output member. In a transmission of this type the reciprocating output member has its stroke varied in proportion to input speed.

One feature of this invention is that the drive member is connected to the input member for rotation therewith and for radial movement relative thereto between eccentric and concentric positions. Another feature is that the driven member is journalled about the drive member for reciprocation thereby, the stroke varying directly with the degree of eccentricity of the drive member. Yet another feature is that the eccentricity of the drive member is controlled by centrifugal means. Still another feature is that the centrifugal means comprises a support member journalled about the input member, a control member eccentrically pivoted thereto and operatively attached to the drive member, and a centrifugal weight for pivoting the control member to vary the eccentricity of the drive member in inverse proportion to input member speed. A further feature is that a balance member similar to the drive member is mounted on the input member for similarly controlled eccentric movement in a direction diametrically opposite that of the drive member to balance the input member. A yet further feature is that the output member is a pump piston and an oscillating crank arm interconnects the driven member and the pump piston to provide a reciprocating stroke therefor.

Further features of this invention will become readily apparent upon reference to the following detailed description of the attached drawings in which.

Figure 1:
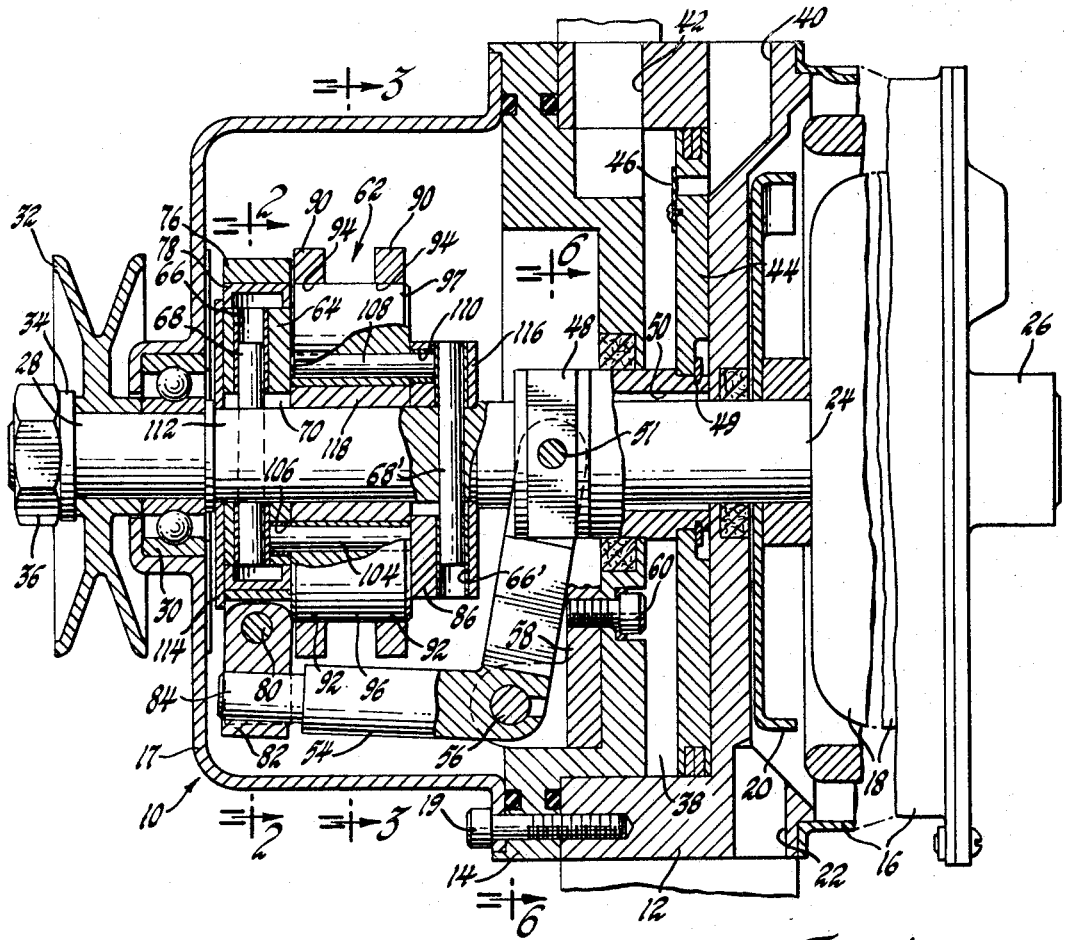
FIGURE 1 is a partially broken away plan view of a pump assembly incorporating a power transmission according to this invention.

Referring now to FIGURE 1 of the drawings, a pump assembly 10 generally includes a pair of intermediate housing members 12 and 14 and a pair of cylindrical end housing 16 and 17 and is secured together by bolts 19. Assembly 10 is adapted to be conventionally mounted by means, not shown, within a vehicle engine compartment, not shown. Housing 16 contains a conventional generator or alternator 18 which is adapted to be connected to the vehicle electrical system, not shown. Alternator 18 includes a fan 20 which is supplied with air through an inlet 22 in housing member 12 to cool the alternator. Alternator 18 and fan 20 are rotatably driven by an input shaft 24 extending through assembly 10 and journalled at one end 26 in housing 16 and at the other end 28 in a conventional ball bearing assembly 30 retained in housing 17. A drive pulley 32 is retained on shaft end 28 by a washer 34 and a bolt 36. Pulley 32 is adapted to be conventionally driven from the engine crank shaft by a fan belt, not shown.

Figure 6:
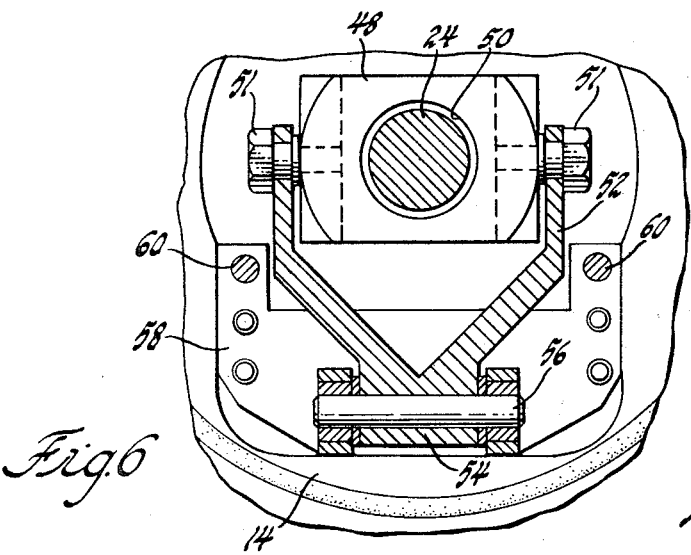
FIGURE 6 is a sectional view taken generally on the plane indicated by line 6—6 of FIGURE 1.

Housing member 12 and 14 define an annular pump cavity 38 having an inlet 40 and an outlet 42. A plate-like pump piston 44 is reciprocable within cavity 38 and includes a flap valve 46. The pump is adapted to be connected to the vehicle engine for use in an air injection or other similar system, not shown. Piston 44 is secured to a plunger 48 by snap ring 49 for movement therewith. Plunger 48 includes a central bore 50 through which shaft 24 extends. As shown in FIGURE 6, bolts 51 pivot plunger 48 to a yoke 52 of a crank arm 54. Crank arm 54 is pivoted by a pin 56 to a bracket 58 which is bolted at 60 to housing member 14. Crank arm 54 is oscillatable about pin 56 and thereby imparts a reciprocating stroke to plunger 48 and piston 44. As shown in FIGURE 1, crank arm 54 is driven by a power transmission 62 according to this invention, as will now be described.

Figure 2:
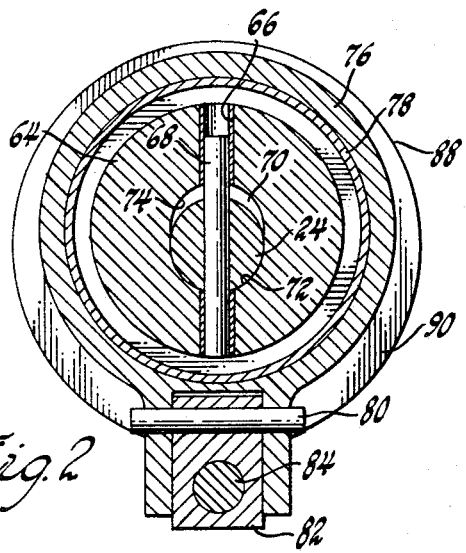
FIGURE 2 is a sectional view taken generally on the plane indicated by line 2—2 of FIGURE 1.

Referring now to FIGURE 1 and particularly to FIGURE 2, an annular drive member 64 has radial slots 66 which receive the ends of a pin 68 secured to shaft 24. Drive member 64 is thus rotatable with shaft 24, but includes an elongated central slot 70 to permit sliding movement radially of shaft 24 on pin 68. When shaft 24 engages one end 72 of slot 70, as shown, drive member 64 is eccentric with respect to the shaft. When shaft 24 engages the other end 74 of slot 70, the drive member and the shaft are concentric.

A driven member or yoke 76 is journalled about drive member 64 through an annular bearing 78. Yoke 76 is pivoted by a pin 80 to a link 82 which journals a reduced end portion 84 of crank arm 54. Thus, when drive member 64 is positioned eccentrically, rotation of shaft 24 will cause yoke 76 and link 82 to oscillate crank arm 54 and consequently reciprocate pump piston 44. The eccentric rotation of drive member 64 also causes rocking motion of yoke 76 which is permitted by the journal connection between link 82 and arm end 84.

Figure 5:
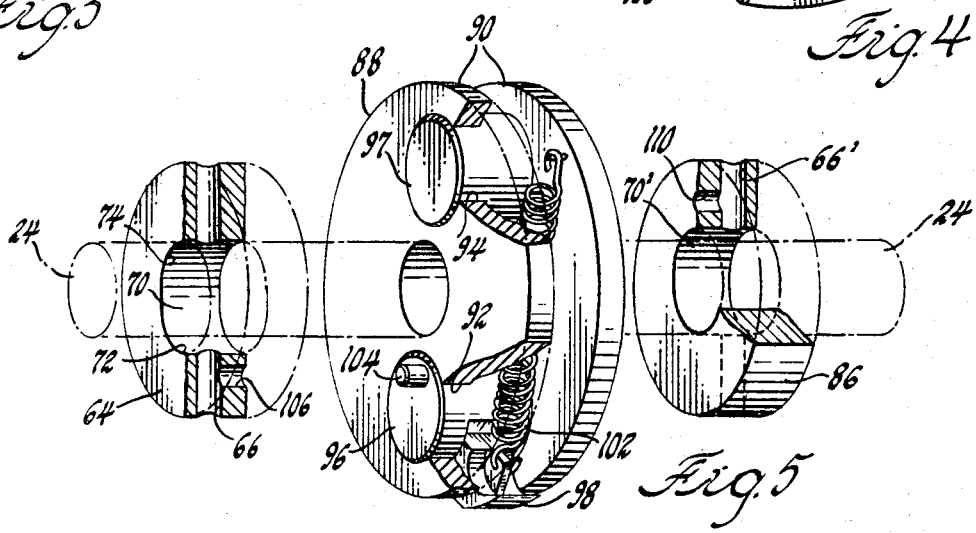
FIGURE 5 is an exploded perspective view of the power transmission.

Referring now to FIGURES 1 and 5, a balance member 86 identical to drive member 64 is similarly connected to drive shaft 24 by a pin 68' for radial movement between positions of concentricity and eccentricity. However, this movement is in a direction diametrically opposite that of drive member 64 to thereby balance the shaft. Balance member 86 similarly includes radial slots 66' and a central slot 70'.

The eccentricity of drive member 64 and balance member 86 is controlled by a centrifugally operated mechanism best shown in FIGURES 1, 3, 4 and 5. A support member 88 is journalled about shaft 24 between members 64 and 86 and includes a pair of annular flanges 90. The flanges 90 include diametrically opposed, equally spaced bores 92 and 94 which journal respective cylindrical control members 96 and 97. An angled weight 98 is secured to each control member by a bolt 100. Each weight 98 is secured in a radially inward position by a tension spring 102 secured to support member 88. As best shown in FIGURES 1 and 5, control member 96 includes an eccentric pin 104 which is rotatably received within an axial aperture 106 of drive member 64. Similarly, control member 97 includes an eccentric pin 108 which is received within an axial aperture 110 of balance member 86. Members 64, 86 and 88 are axially retained on a reduced portion 112 of shaft 24 by a pair of end plates 114 and 116.

Figure 3:
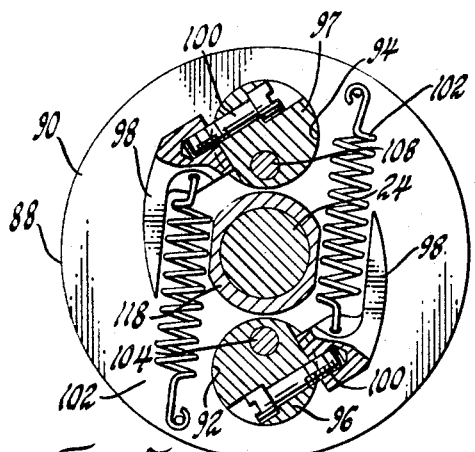
FIGURE 3 is a sectional view taken generally on the plane indicated by line 3—3 of FIGURE 1, showing the centrifugal means at low speed.

Referring now to FIGURE 3, at low rotational speeds of shaft 24, weights 98 are drawn inwardly by springs 102 to position control members 96 and 97 with pins 104 and 108 radially inwardly of support member 88. Pins 104 and 108 thus position members 64 and 86 in the extreme eccentric positions of FIGURE 2 to produce a maximum stroke in piston 44. Thus at low rotational speeds of shaft 24, the pump has a maximum output.

Figure 4:
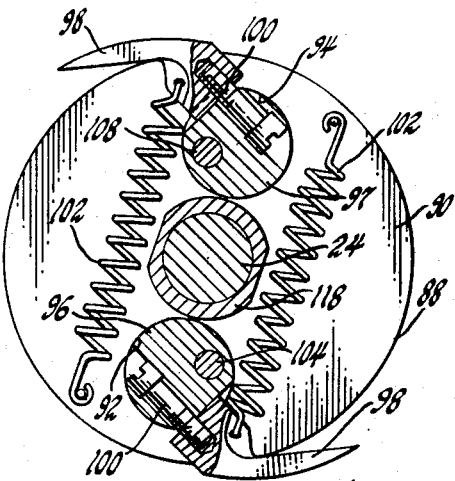
FIGURE 4 is a view similar to FIGURE 3, showing the centrifugal means at high speed.

Referring now to FIGURE 4, as the speed of shaft 24 increases, weights 98 are thrown radially outwardly of support member 88 to position control members 96 and 97 with pins 104 and 108 radially outwardly of support member 88. Pins 104 and 108 thus move members 64 and 86 to a position of less eccentricity, shortening the stroke of pump piston 44. As the speed of shaft 24 increases, the pump output will be reduced until, at a predetermined maximum speed, members 64 and 86 attain concentricity with shaft 24 and thereby reduce the stroke of piston 44 and the output of the pump to zero.

As control members 96 and 97 move from the position of FIGURE 3 to that of FIGURE 4, the eccentric placement of pins 104 and 108 necessitates relative movement between members 64 and 86 and support member 88. Since members 64 and 86 are nonrotatably fixed to shaft 24, a bearing 118 is provided to permit support member 88 to rotate slightly about shaft 24.

It is readily apparent that this transmission may be modified so that the output is varied in direct proportion to input speed. This may be accomplished by reversing the movement of members 64 and 86 so that their eccentricity varies in direct proportion to input shaft speed, thereby producing a maximum pump stroke at maximum shaft speed.

The association of the pump and power transmission with alternator 18 merely exemplifies one convenient vehicular arrangement. In different environments, alternator 18 could be deleted or replaced by a motor which could drive shaft 24, replacing the pulley drive.

Thus, this invention provides a power transmission for a reciprocating pump in which the pump stroke is varied in inverse proportion to input shaft speed from a maximum to zero. This power transmission is not limited to a pump application but is useful in any mechanism to vary an output While only a preferred embodiment of this invention is shown and described, other modifications are contemplated within the scope of this invention.

I claim:
1. A power transmission comprising:
   a rotary input member,
   a reciprocating output member,
   a drive member mounted on the input member for rotation therewith and for radial movement relative thereto between positions of eccentricity and concentricity with respect to the input member,
   a support member journalled on the input member,
   a control member eccentrically pivoted to the support member,
   the drive member being eccentrically pivoted to the control member,
   weight means mounted on the control member and responsive to an increase in input member speed to pivot the control member and thereby move the drive member radially to change the eccentricity thereof,
   a driven member operably connected to the drive member, and
   means interconnecting the driven member and the output member,
   whereby the stroke of the output member is varied in proportion to the speed of the input member.
2. The power transmission recited in claim 1 including:
   a balance member mounted on the input member for rotation therewith and for radial movement relative thereto between positions of eccentricity and concentricity with respect to the input member in a direction diametrically opposite that of the driven member,
   a second control member eccentrically pivoted the support member,
   weight means mounted on the control member and responsive to an increase in input member speed to pivot the second control member and thereby move the balance member radially in a direction diametrically opposite the movement of the drive member to change the eccentricity of the balance member.
3. The power transmission recited in claim 2 wherein, the weight means, the drive member, and the control member are interconnected so that the weight means are relocated upon increased input member speed to move the drive member radially of the input member toward a position of less eccentricity to thereby shorten the stroke of the output member.
4. The power transmission recited in claim 3 wherein:
   the driven member comprises a yoke member journalled about the drive member for reciprocation thereby upon eccentric rotation of the drive member, and
   the interconnecting means include a crank connected to the yoke member for oscillation thereby, and connected to the output member for reciprocation thereof.

References Cited

UNITED STATES PATENTS

| | | | |
|---|---|---|---|
| 637,297 | 11/1899 | Strong | 103—38 |
| 778,930 | 1/1905 | Welivar | 74—601 |
| 1,090,500 | 3/1914 | Primm | 74—571 |
| 1,137,877 | 5/1915 | Manly | 103—38 |
| 1,274,955 | 8/1918 | Sundh | 103—38 |
| 2,157,088 | 5/1939 | Seidel. | |

WILLIAM L. FREEH, Primary Examiner.

LAURENCE V. EFNER, *Assistant Examiner.*